May 14, 1946.   J. R. SIEGER   2,400,265
HOBBY-HORSE VELOCIPEDE
Filed Aug. 21, 1944

Inventor
John R. Sieger
By Liverance and Van Antwerp
Attorneys

Patented May 14, 1946

2,400,265

UNITED STATES PATENT OFFICE 2,400,265

HOBBYHORSE VELOCIPEDE

John R. Sieger, Hudsonville, Mich.

Application August 21, 1944, Serial No. 550,412

4 Claims. (Cl. 280—1.19)

Figure 1:
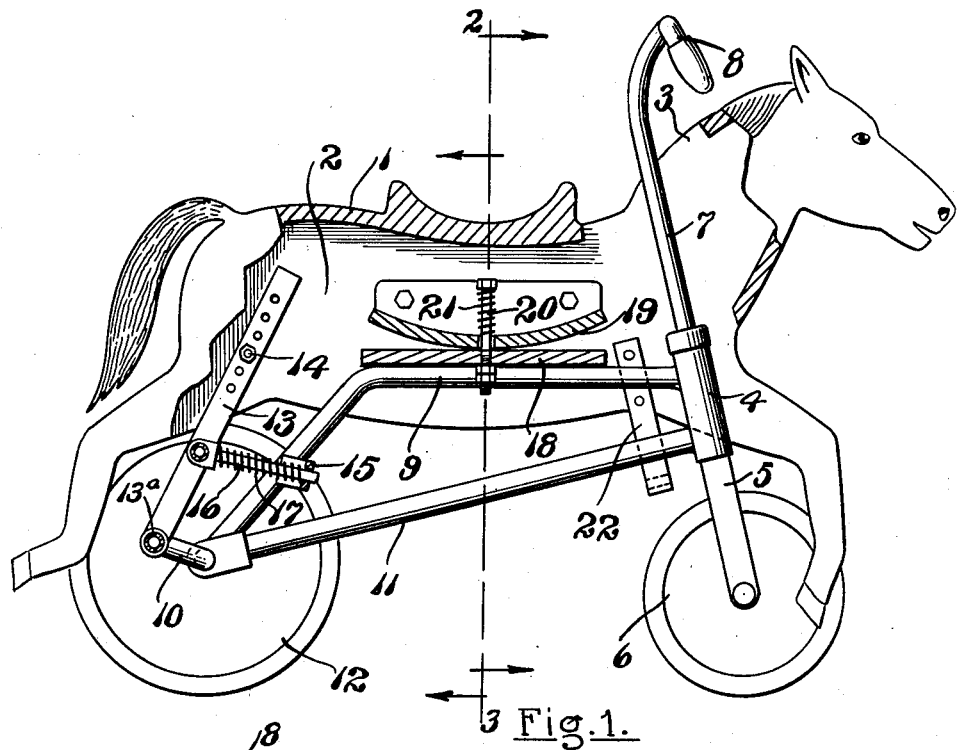

This invention relates to a hobby horse velocipede, being a novel and practical improvement upon the structure shown in my Patent No. 1,532,204, issued April 7, 1925. A primary object and purpose of the present invention is to provide a novel structure of a crank axle driven hobby horse, the body of the hobby horse being rocked back and forth to impart motion to a crank axle upon which driving wheels are carried to thereby propel the hobby horse velocipede in a forward direction. A further object of the invention is to provide a construction which is strong and durable and practical from a utility and manufacturing standpoint, and in which the rocking of the body is attained in a novel manner and more effectively than heretofore. Other objects and purposes than those stated will appear upon an understanding of the invention had from the following description, taken in connection with the accompanying drawing, in which, Fig. 1 is a side elevation and partial longitudinal vertical section illustrating the preferred construction which I have devised.

Figure 2:
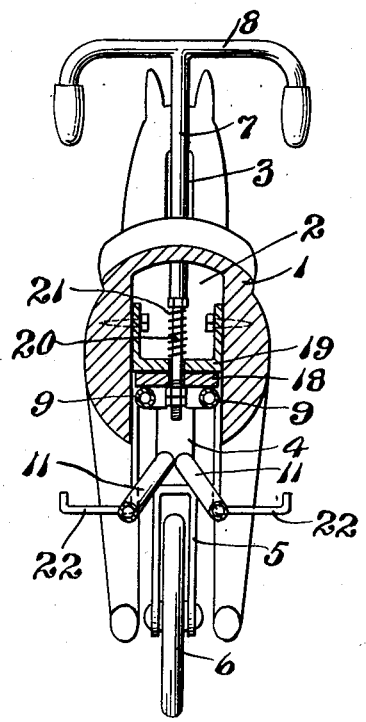
Figure 3:
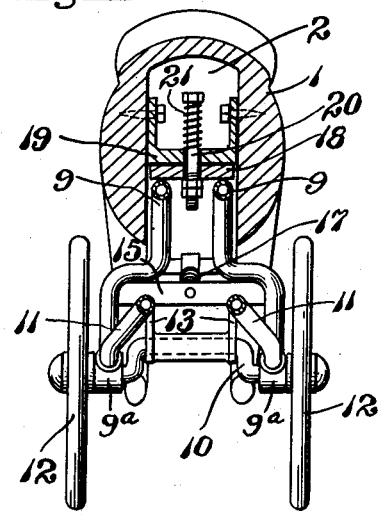

Figs. 2 and 3 are transverse vertical sections upon the plane of line 2—3, Fig. 2 looking in a forward direction, and Fig. 3 to the rear.

Like reference characters refer to like parts in the different figures of the drawing.

The body 1 of the hobby horse may take the form of a horse or it may be a simulation of some other animal. It is longitudinally recessed from its lower side toward but short of its upper side, said recess being indicated at 2, and has a slot 3 at the upper portion of the neck for the passage of the steering post.

The body is mounted upon a frame, preferably of metal, which includes a front vertical sleeve 4 through which a steering post having a lower fork 5 carrying a front wheel 6 passes, and is mounted for turning about its longitudinal axis. The steering post 7 extends upwardly through the slot 3 and is provided with handle bars 8 at its upper end.

Back of the post 4 the frame includes upper tubular bars or rods 9 which are converted to and extend horizontally rearward of the sleeve 4 for a distance and are then bent to extend downwardly and to the rear, and are connected with lower frame rods or tubes 11 secured at their front ends to the sleeve 4 and at their rear ends together with the rear ends of the tubular rods 9 to two bearing sleeves 9a in which an axle crank shaft 10 is mounted for rotation, said shaft providing a rear axle for the hobby horse, and at its ends having wheels 12 secured.

Connected with the offset portion of the crank shaft axle 10 is a connecting rod structure including two side bars 13 which preferably may be joined by a sleeve 13a at the lower end (Fig. 3) forming a bearing around the offset or crank portion of the axle 10, the upper end portions of the bars 13 lying against opposite inner sides of the body 1. Each of the bars 13 has a plurality of spaced openings through which bolts supplied with nuts, as indicated at 14, may be passed, said bolts pivotally connecting the bars 13 with the body 1 at different adjusted positions, depending upon which of the openings in the bars 13 the bolts pass. A transverse bar 15 extends between the tubular frame bars 9 adjacent their rear end portions being connected at its ends thereto. A rod 16 has a free end passing through an opening in the bar 15, its other end being supplied with a yoke which has a pivotal connection with the bars 13 (Fig. 1) and a coiled compression spring 17 surrounds the rod between the bar and yoke.

A platform 18 is supported upon, bridges the space between and is connected in any suitable manner to the frame members 9. A rocker 19 preferably of a channel form in cross section is located between the sides of the body 1, one at each side of the central recessed portion 2 thereof, and permanently secured in place. Said rocker 19 of a convex shape at its lower side rests upon the platform 18. A bolt 20 passes through a relatively large opening in the bottom of the rocker 19 and through the platform 18 having nuts threaded thereon below the platform, with a coiled spring 21 between the head of the bolt and the upper side of the rocker as shown in Fig. 1.

Adjacent the front portion of the body two stirrups 22 as shown are permanently secured.

With this construction a child seated upon the body may rock it back and forth through the bearing of the rocker 19 against the platform 18 causing an operation of the connecting rod structure described. This causes a rotation of the crank axle 10 and a consequent rotation of the wheels 12 secured therewith so that the velocipede is propelled. It is steered by turning the steering post 7 through the handle bars 8 in the usual manner. The spring at 17 insures against the crank axle 10 stopping at any dead center line position. The adjustment provided by the holes in the bars 13 and securing bolts 14 provides for attaining the best operating conditions for the one who is riding and operating the velocipede.

The construction is sturdy, attractive in appearance and readily manufactured and assembled.

The rocking action provided is of aid in rocking the body to propel the velocipede in a more effective manner than heretofore.

The invention is defined in the appended claims and is to be considered comprehensive of all forms of structure coming within their scope.

I claim:

1. In a construction as described, the combination of a frame including a generally vertical sleeve at the front end thereof, upper and lower bars extending rearwardly therefrom and joined at their rear ends to provide bearings, a crank axle rotatably mounted in said bearings, wheels at the end of the crank axle, a steering post extended through said sleeve, a wheel mounted at the lower end of the steering post, a hobby-horse body longitudinally recessed at its under side into which the upper portion of said frame extends and through the forward portion of which the upper part of the steering post passes, a platform carried on the upper bars of said frame, a rocker between the ends of said hobby-horse body and within the recess therein bearing upon said platform whereby the body may be rocked back and forth upon the platform, and connecting rod connecting means secured at its lower end to the crank axle and extending upwardly into the recess in said body and connected with the body, as specified.

2. A construction as defined in claim 1, and a rod pivotally connected to said connecting rod means above the crank axle, a transverse bar connected to said frame through which the rod passes and a coiled compression spring around said rod between the bar and the connecting rod.

3. In a structure as described, the combination of a wheel supported frame with means for steering said frame, a crank axle at the rear of the frame, wheels thereon, a body located over the frame, connections between the rear portion of the body and the crank axle for turning the axle on rocking the body, a bearing platform carried by the frame, a rocker connected with the body having a convex under side secured to said body and bearing upon the platform, and a bolt extending through said rocker and platform, and a compression spring around the bolt between the rocker and the head of the bolt.

4. In a structure as described, the combination of a wheel supported frame with means for steering said frame, a crank axle at the rear of the frame, wheels thereon, a body located over the frame, connections between the rear portion of the body and the crank axle for turning the axle on rocking the body, a bearing platform carried by the frame, a rocker connected with the body having a convex under side secured to said body and bearing upon the platform, said connections between the body and the crank axle comprising, a bar pivotally connected at its lower end to the crank axle and extending upwardly to and within the body and provided with a plurality of spaced apart openings lengthwise thereof in its upper portion, and means carried by the body insertable selectively through said holes for adjustably connecting said bar to the body.

JOHN R. SIEGER.